United States Patent

Cherry

[15] 3,694,731
[45] Sept. 26, 1972

[54] MULTIPLE MODE VEHICLE POWER SUPPLY SYSTEM

[72] Inventor: James R. Cherry, Barrington, Ill.

[73] Assignee: Motorola, Inc., Franklin Park, Ill.

[22] Filed: June 18, 1971

[21] Appl. No.: 154,332

[52] U.S. Cl. ............... 321/27 R, 307/82, 307/87, 320/41, 320/59, 321/28, 322/29
[51] Int. Cl. ............... H02m 7/04, H02h, H02j
[58] Field of Search ....... 321/27 R, 28, 47; 310/68 D; 322/29, 30; 307/87, 82; 320/41, 57, 59

[56] References Cited

UNITED STATES PATENTS

| | | | |
|---|---|---|---|
| 3,353,090 | 11/1967 | Sawyer | 322/29 X |
| 3,378,755 | 4/1968 | Sawyer | 322/29 |
| 2,980,842 | 4/1961 | Medlar | 321/27 R |

FOREIGN PATENTS OR APPLICATIONS 1,021,229  3/1966  Great Britain ........... 321/27 R

*Primary Examiner*—William H. Beha, Jr.
*Attorney*—Vincent Rauner et al.

[57] ABSTRACT

A motor vehicle power supply system includes an alternator having a three winding stator with the windings being disconnected electrically. The output of each winding is rectified by a full wave bridge circuit. Switches are positionable to a first condition for connecting the bridge circuit outputs in series at relatively low alternator speeds, to a second condition for connecting two of the bridge circuit outputs in series and in parallel with the third bridge circuit output for higher alternator speeds and to a third condition for connecting the bridge circuit outputs in parallel for even higher alternator speeds.

5 Claims, 2 Drawing Figures

INVENTOR:
JAMES R. CHERRY
BY: Ronald L. La Porte
ATTY.

MULTIPLE MODE VEHICLE POWER SUPPLY SYSTEM

BACKGROUND

This invention relates generally to power generating systems and more particularly to such systems used in motor vehicles.

Motor vehicle power supply systems for providing current from an electrical alternator device are limited by the design characteristics of the alternator. In motor vehicle power supplies, sufficient current output at low and high engine speeds is desirable.

It has been suggested that to provide the above, the stator winding of the alternator in a motor vehicle power supply system be connected first in wye configuration for low engine speed operation and in delta configuration for higher engine speed operation. To accomplish the latter, a rotary or centrifugal switch might be used. Problems such as switch location, arcing and mechanical failure, however, may be present. Furthermore, transient inductive voltage may produce "inductive kick" when switching occurs.

SUMMARY

Accordingly, it is an object of the present invention to provide a new and improved power supply system which provides sufficient output at relatively low and high engine speeds.

It is another object of the invention to provide an alternator for a power supply system wherein the output thereof may be connected to provide sufficient output at both low and high engine speeds without the necessity for physically switching the stator winding between several modes of operation.

Briefly, a preferred embodiment of the power supply system according to the invention includes an alternator having a rotating field winding and a three winding stator, the windings being disconnected electrically. The output of each of the windings is connected to a full wave rectification bridge circuit. Switches are provided which are positionable to a first condition for connecting the bridge circuit outputs in series for relatively low alternator speeds to a second condition whereby a pair of the bridge circuit outputs are in series with respect to each other and the combination is in parallel with respect to the third bridge circuit output for higher alternator speeds and to a third condition whereby the bridge circuit outputs of the three windings are connected in parallel relation for even higher alternator speeds.

DETAILED DESCRIPTION

Figure 1:
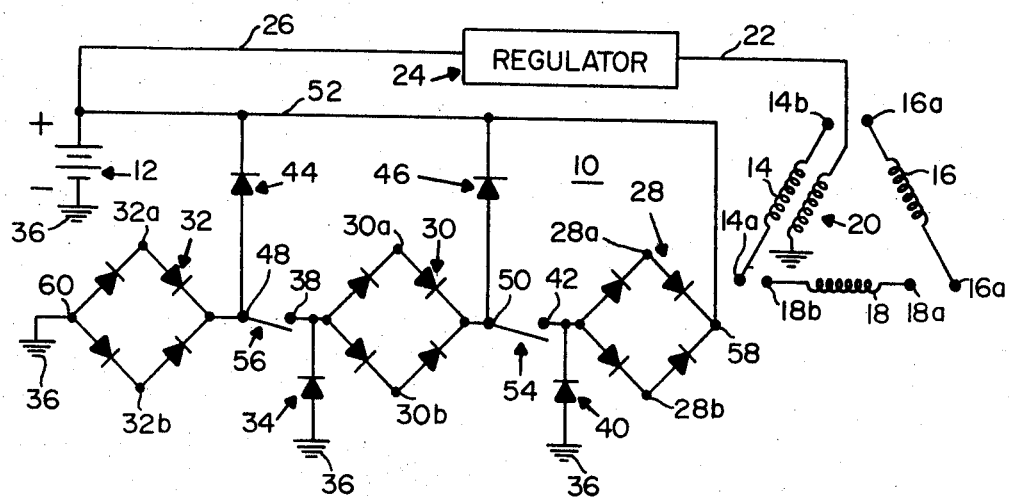
FIG. 1 is a schematic diagram of a preferred embodiment of a power supply system according to the invention.

Referring now to the drawing in greater detail, FIG. 1 illustrates a preferred embodiment of motor vehicle power supply 10 according to the invention used for powering a load 12, herein shown as a battery.

The power supply system includes three windings, 14, 16, 18 which provide a generated output. The windings 14, 16, 18 as shown herein are the phases of a conventionally wound alternator stator winding which have been electrically disconnected from each other. The outputs generated at the windings are 120° out of phase, buy may, however, be in phase with respect to each and still fall within the scope of the present invention.

The field excitation is provided by a conventionally wound field winding 20, rotatable in accordance with the engine of the motor vehicle in which the power supply system is incorporated, and connected via lead 22 to a standard voltage regulator 24 which in turn is connected over lead 26 to load 12. Load 12 is connected to a reference potential 36 as well.

The outputs 14a, 14b; 16a, 16b; and 18a, 18b of the alternator windings 14, 16, 18, respectively, are each connected to the inputs 28a, 28b; 30a, 30b; and 32a, 32b of corresponding, conventional full wave rectifier bridge circuits 28, 30, 32.

A diode 34 is connected between reference potential 36 and the negative output 38 of bridge circuit 30, while another diode 40 is connected between the reference potential and the negative output 42 of bridge circuit 28. Diodes 44, 46, are connected between the positive outputs 48, 50, of bridge circuits 32, 30, respectively, and lead 52 which is connected to the load 12.

The outputs of the bridge circuits can be connected in series, or the outputs of two series connected rectifier bridge circuits can be connected in parallel with the third rectifier bridge circuit or the outputs of the rectifier bridge circuits can be connected in parallel, in accordance with the condition of switching circuitry including switches 54, 56. Switch 54 is connected between the negative and positive outputs 42, 50 of bridge circuits 28, 30, respectively, and switch 56 is connected between the negative and positive outputs 38, 48 of bridge circuits 30, 32, respectively.

In series operation, both switches 54, 56 are in a first condition wherein the switches are closed. The output of the series connected bridge circuits 28, 30, 32 is taken at the positive output 58 of bridge circuit 28 and is provided to the load over lead 52. The series connected bridge circuits are connected to the reference potential 36 at the negative output 60 of bridge circuit 32.

In the case wherein two of the rectifier bridge circuit outputs are connected in series and the combination is connected in parallel with the third bridge circuit output, one of the switches is closed and the other is open. When switch 54 is closed, and switch 56 is open, bridge circuits 28, 30 are connected in series with respect to each other so that the output therefrom is taken at the positive output 58 of bridge circuit 28 over lead 52 to the load, and diode 40 connects the combination to the reference potential. The positive output of bridge circuit 32 is connected through diode 44 to the lead 52 connected to load 12 and the negative output 60 of bridge circuit 32 is connected to the reference potential 36. The output of bridge circuit 32 is connected in parallel with the series connected bridge circuits 28, 30. It should be noted that switch 54 could be open and switch 56 closed to provide a series combination in parallel with the third bridge circuit output. In the latter case, bridge circuits 30, 32 are series connected with the output therefrom connected to the load through diode 46 and lead 52. The third bridge circuit 28 is connected to the load at the positive output 58 thereof and to the reference potential through diode 40.

In parallel operation, both switches 54, 56 are open. In this case, the outputs of bridge circuits 28, 30, 32 are taken at the positive outputs 58, 50 and 48; the last-mentioned outputs 50, 48 being connected to lead 52 through diodes 46, 44, respectively. The bridge circuits 28, 30, 32 are connected to the reference potential 36 at negative outputs 42, 38 and 60, respectively.

Figure 2:
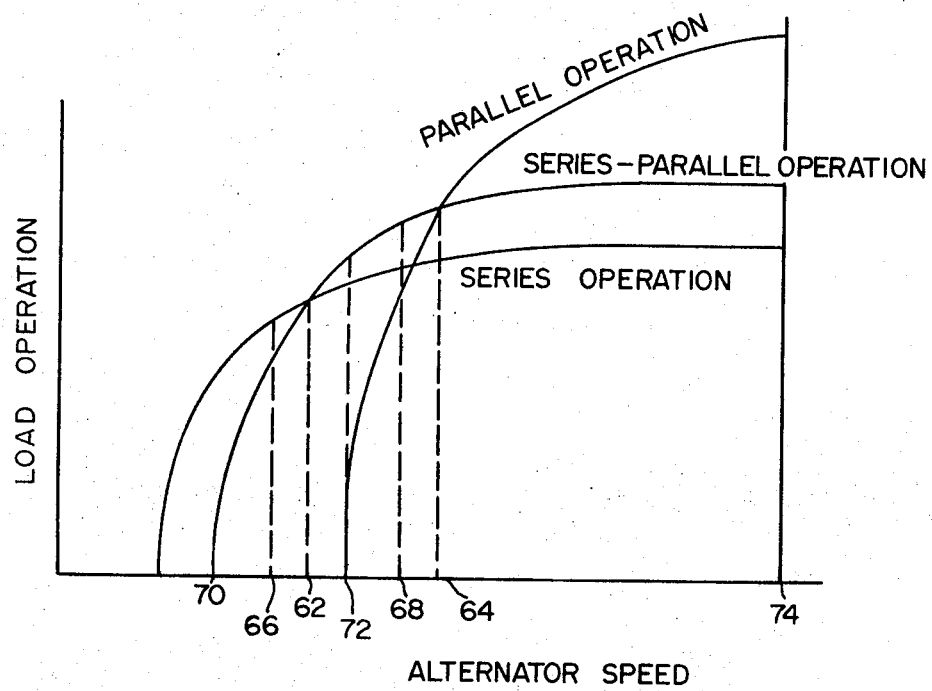
FIG. 2 is a graph of the load current versus alternator speed of the system of FIG. 1.

In FIG. 2, the load current of the power supply system of FIG. 1 is plotted against the alternator speed. The graph shows that series operation provides an output current at much lower alternator speeds than the series-parallel or parallel operation. However, once reaching a first predetermined speed, indicated at point 62, whereat the series and series-parallel curves cross, the load current increases more rapidly during series-parallel operation for greater alternator speeds. Furthermore, at an even greater predetermined increase in alternator speed, i.e., at point 64 on the graph, the parallel mode of operation produces an even greater increase in load current for greater alternator speeds. Thus, in an overall operation of the power supply system of FIG. 1, greater load current can be realized at both low and high alternator speeds than could be realized with a conventional alternator arrangement.

FIG. 2 also shows two other points 66, 68, which indicate the speeds at which switching of the operation of the alternator outputs would occur. The speeds, however, are dependent on the characteristics of the switching devices employed, and thus points 66, 68 may vary anywhere from points 70, 72, respectively, the starting speeds for the series-parallel and parallel operation, respectively to point 74, the maximum speed of the alternator. The switching means used may be mechanical, electromechanical or electrical. It should be noted that switching as described is desirable for both increasing and decreasing alternator speeds.

The rectifier bridge circuits 28, 30, 32 in addition to providing full wave rectification, also aid in preventing transient type inductive voltage "kick" when switches 54, 56 are changed for different modes of operation.

Thus, the power supply system according to the invention provides an efficient means for obtaining good load current output between relatively low and high alternator speeds without requiring switching of the connections of the phases of a stator winding of the alternator in the system.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A power supply system for an electrical load, including in combination; voltage generating means having first, second and third winding means, first, second and third rectifying means connected to said first, second and third winding means, respectively, each said rectifying means comprising a rectifier circuit having positively and negatively polarized outputs, and switching means operable to first, second and third conditions for connecting the outputs of said rectifying means to the load, said switching means in said first condition connecting the outputs of said rectifying means in series with respect to each other, in said second condition connecting the outputs of said first and second rectifying means in series with respect to each other and the combination in parallel with the output of said third rectifying means and in said third condition connecting the outputs of said rectifying means in parallel with respect to each other, said switching means including first and second switches, a first one of which is coupled between the positively polarized output of said second rectifier circuit and the negatively polarized output of said first rectifier circuit and the second one of which is coupled between the negatively polarized output of said second rectifier circuit and the positively polarized output of said third rectifier circuit.

2. A power supply system as claimed in claim 1 wherein said first and second switches each have a first closed and second open operating condition, both said switches being closed to connect the outputs of said rectifying means in series, one of said switches being closed and one being open to connect the outputs of said first and second rectifying means in series and in parallel with said third rectifying means and both being open to connect the outputs of said rectifying means in parallel.

3. A power supply system as claimed in claim 2 wherein each said rectifying means comprise a full wave rectifier circuit and wherein said power supply system further includes first, second, third and fourth electron control devices, said first device connected between the positive output of said third rectifier circuit and the load, said second device connected between the positive output of said second rectifier circuit and the load, said third device connected between a reference potential and the negative output of said second rectifier circuit and said fourth device connected between the reference potential and the negative output of said first rectifier circuit, said devices being in a non-conducting state when said switches are both closed, said first and third devices conducting when said first switch is closed and said second switch is open and said device is being in a state of conduction when said switches are open.

4. A power supply system as claimed in claim 3 wherein said electron control devices include diodes.

5. A motor vehicle power supply system for providing power to an electrical load including in combination; an alternator having a three winding stator, the windings being disconnected from each other electrically, and a rotating field winding for inducing a current flow in the three windings to provide an output therefrom, said field winding being rotated in accordance with the speed of the engine of said vehicle, first, second and third rectification means for rectifying the outputs of the first, second and third windings of said three winding stator, respectively, means for regulating the outputs of said stator windings and switching means operable to first, second and third conditions in accordance with the speed of rotation of said field winding to connect the outputs of said rectification means to the load, said switching means in said first condition connecting the outputs of said rectification means in series, in said second condition connecting the outputs of said first and second rectification means in series and in parallel with the output of said third rectification means and in said third condition connecting the outputs of said rectification means in parallel, wherein each said rectification means include a full wave rectifier bridge circuit, each having first and second inputs connected to a corresponding one of said three windings of said stator and a positive and negative output, and wherein said switching means include first and second switches, said first switch connected between the negative and positive outputs of said first and second rectifier bridge circuits, respectively, and said second switch connected between the negative and positive outputs of said second and third bridge circuits, respectively, said first and second switches being closed for connecting said bridge circuit outputs in series, one of said switches being closed and one being open for connecting two of said bridge circuit outputs in series and in parallel with respect to the third bridge circuit output and both of said switches being open for connecting said bridge circuit outputs in parallel.

* * * * *